United States Patent Office 3,551,138
Patented Dec. 29, 1970

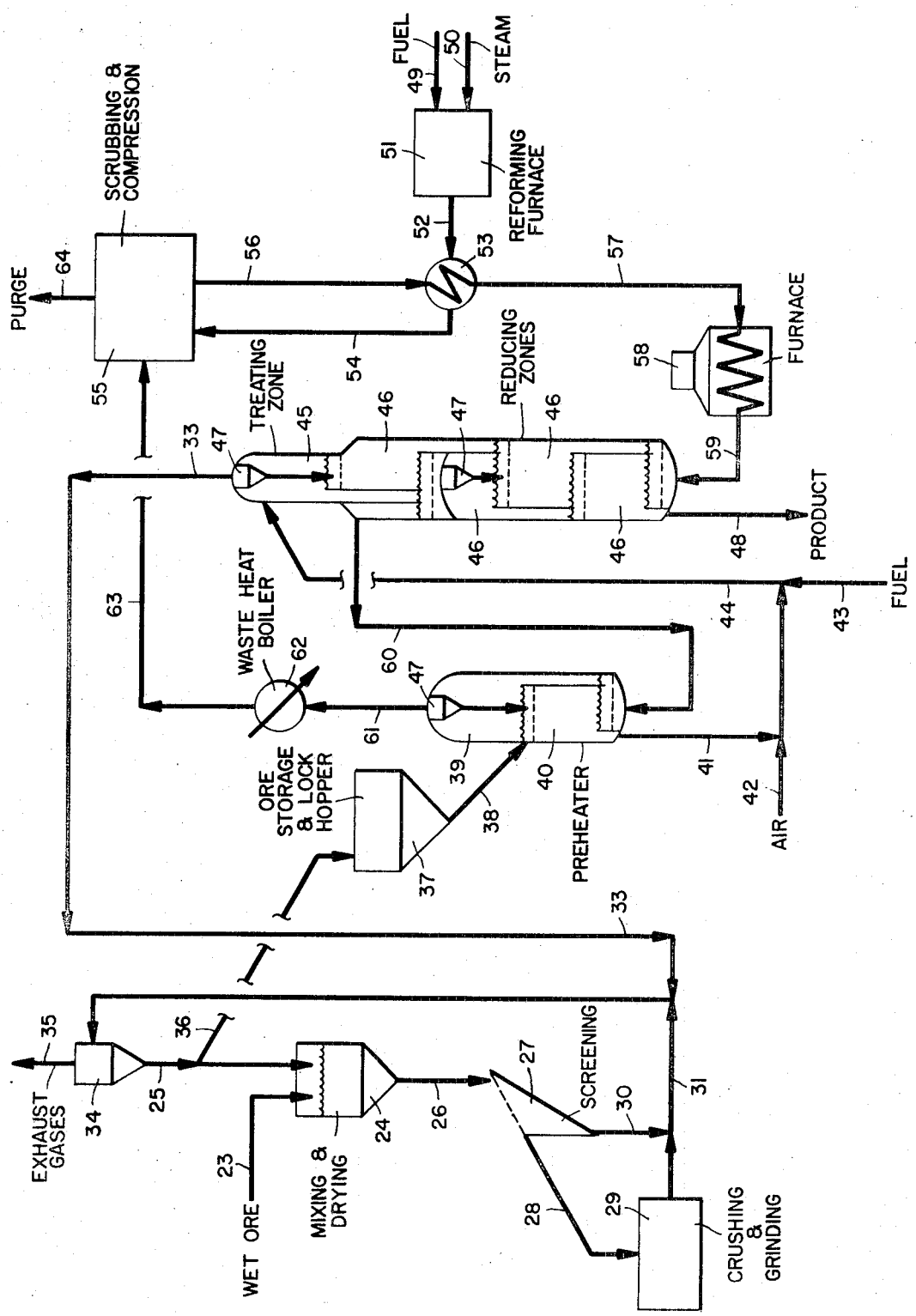

3,551,138
IRON ORE REDUCTION PROCESS
James W. Brown, Halifax, Nova Scotia, Canada, Francis X. Mayer, Baton Rouge, La., and Theodore Kalina, West Orange, N.J., assignors to Esso Research and Engineering Company, a corporation of Delaware
Continuation-in-part of application Ser. No. 514,265, Dec. 16, 1965. This application Mar. 14, 1968, Ser. No. 729,853
Int. Cl. C21b 13/00; C22b 1/10
U.S. Cl. 75—26      20 Claims

ABSTRACT OF THE DISCLOSURE

An improved process combination for the production of metallic iron from oxidic iron ores wherein the ore is progressively treated and thence reduced. Fluidized ore is sequentially passed through a series of zones comprising staged preheat zones, an intermediate treating zone and, finally, staged reduction zones. Reducing gas is fed into the zones countercurrently to the direction of ore flow. A portion of the partially oxidized off-gas from the reducing zones is injected into the intermediate treating zone, while all or a part of the remaining reducing gas can be injected into the staged preheat zones or regenerated and recycled. Off-gas from the intermediate treating zone can be contacted with the ore entering the staged preheat zones, or injected directly thereto, this latter step being preferred where the reducing gas is not fed directly to these zones.

---

This is a continuation-in-part of application Ser. No. 514,265, filed Dec. 16, 1965; now forfeited.

It is well known to produce metallic iron by reduction of oxidic iron ores, i.e., ores containing oxides of iron, in beds fluidized by ascending gases at temperatures ranging generally from about 1000° F. up to just below the sintering temperature, i.e., about 1800° F. for most ores. In such processes, several fluidized beds are generally provided and these beds are stages as separate reduction zones operated at the same or different elevated temperatures. The several fluidized beds can be housed within a single reactor.

In a typical staged fluidized iron ore reduction process, particulate oxidic iron ores are introduced into the top of the reactor and flowed downwardly from a fluidized bed to the next succeeding bed and within each bed the state of oxidation of the ore is progressively lowered. Thus, the ore flows from one of a series of staged reduction zones to the next lower succeeding stage. In the several stages the ore is reduced, e.g., from ferric oxide to magnetite (or a mixture approximating the composition of such compound), from magnetite to ferrous oxide and from ferrous oxide to substantially metallic iron. Generally, the metallic iron product ranges from about 85 to 95%, and higher, metallic iron.

As the ore descends through the reduction zones it is contacted by upwardly flowing gases and reduced, while simultaneously the reducing components of the ascending gas are oxidized. The partially oxidized gas is generally regenerated by removal of oxidized components. Thus, it is generally desirable to remove the carbon dioxide or water, or both, then to reheat the regenerated gas, i.e., the gas whose reducing potential has been restored, and then to recycle the gas to the process.

Such a fluidized iron ore reduction process most often utilizes externally generated reducing gases, e.g., gaseous mixtures consisting of hydrogen and carbon monoxide or mixtures of these and other gases, which are injected into the bottom stage of the reactor. Such gaseous mixtures can be formed by oxidizing or burning hydrocarbon fuels in a deficiency of oxygen. Alternately, they may be prepared by the catalytic reforming of hydrocarbons, e.g., natural gas or methane, with steam. While the reducing gases generated in accordance with either of these methods provides mixtures of carbon monoxide and hydrogen, the ratio of hydrogen to carbon monoxide differs considerably in the gaseous mixtures.

Difficulties have been encountered, however, in the various process schemes tried thus far, regardless of the reducing gases used. Thus, since carbon monoxide reacts exothermically to reduce the oxidic ores and hydrogen reacts endothermically, the ideal gaseous mixture would contemplate the precise ratio of hydrogen to carbon monoxide required to achieve thermal balance. Economically the use of gases from the catalytic steam reforming of methane or natural gas is a preferred method of operation. The gases from such a process, however, contain very high concentrations of hydrogen. Though hydrogen has very high reducing power, the hydrogen content of such gases is so great as to make it very difficult, if indeed possible, to maintain the high temperatures required in the fluidized iron ore reduction reactor. To compensate for this disadvantageous characteristic of hydrogen, it has been necessary to heat the reducing gas to extremely high temperatures to add enough sensible heat to the reactor to maintain sufficiently high temperatures to carry out the desired reductions. Heating the reducing gas to the required high temperatures, however, results in the cracking of any hydrocarbon present, e.g., methane or natural gas, and this leads to an even more acute problem. Thus, carbon from the cracked hydrocarbon deposits in the heating furnace, making it impractical to continue operations. One method of overcoming the problems of using hydrogen-rich reducing gases is to add large quantities of carbon monoxide to the reactor to obtain the exothermic heat of the carbon monoxide-iron ore reduction reaction. The introduction of excessive carbon monoxide into the process, however, causes additional problems. For example, at the temperatures of the reduction reaction, carbon monoxide undergoes a reversion reaction: $2CO \rightarrow CO_2 + C$, which liberates carbon and causes the deposition of free carbon in the reactor. Moreover, the reversion reaction forms carbon dioxide which lowers the reducing power of the reactor gases. Even worse, excessive carbon monoxide in the recycle reducing gas stream causes the formation of a highly reactive species of carbon in the reactor or recycle process equipment. Thus, the recycle gas is cooled and regenerated by removal of carbon dioxide and water and then reheated and returned to the reactor. Each time the carbon monoxide passes through the range of temperatures which are particularly conducive to reversion, i.e., about 850–1200° F., in the presence of a metallic surface such as iron, which is catalytic to the reversion reaction, quantities of carbon are deposited on the metal surface. At best, the carbon plugs the equipment but, even worse, carbon reacts vigorously with the ferrous constituents of the materials contacted, e.g., heat exchanger tubes. This results in an extreme form of corrosion known as catastrophic carburization. Such corrosion rapidly destroys metal process equipment and weakens it to the extent that it is unsafe to operate. Increased pressure also favors the carbon monoxide reversion reaction. To prevent the possible occurrence of this dread phenomenon, fluid iron ore reduction processes have been carried out at very low pressures, i.e., atmospheric, this necessitating the use of very large reactors for a given gas throughput and also, of course, adversely affecting the reduction kinetics.

Still another disadvantage recognized in the art involves the introduction of the cold iron ore feed directly into the high temperature, i.e., 1000–1800° F., top bed of a fluidized iron ore reduction reactor. This "shock heating" results in decrepitation of some ores to yield large quantities of fines which greatly increases the entrainment in the reactor gases and consequently reduces the metallic iron product yield. Also, some ores, for unknown reasons, reduce only with great difficulty if they are heated up too suddenly.

Yet another disadvantage of the known process is that of holding a high temperature in the top reactor bed. Thus, it is often required to add so much oxygen for heat generation that the reducing power of the recycle gas is greatly lowered, large quantities of fresh reducing gas must be added, and accordingly large purge gas rates are required. The use of the high temperature top bed also results in wasting the sensible heat of the recycle reducing gas since such gas has to be cooled prior to or during regeneration. Thus, before it can be recycled, the reducing gas must be cooled, e.g., to about 200° F., to remove water and carbon dioxide. Moreover, another problem is introduced because the use of high temperatures in the recycle gas necessitates the use of special mechanical equipment which is required to withstand such temperatures. It is also found that entrained iron ore fines tend to stick to the walls of the recycle gas heat exchanger and eventually result in plugging of the exchangers when high temperature gases are recycled.

The solution of these and other difficulties is, therefore, the primary objective of the present invention which contemplates a process in which particulate oxidic iron ore is initially and progressively preheated in a plurality or series of staged preheat zones to substantially lessen decrepitation of the ore, and to more effectively cool the gas and to achieve greater overall thermal efficiency. Subsequently, the ore is subjected to treatment in an intermediate treating zone. The ore is then reduced, or further reduced in a series of staged reducing zones to yield a product which is substantially metallic iron. The reduction is carried out by introducing hot reducing gas to the reduction zones of highest metallization and allowing the gas to pass countercurrently to the iron ore, to fluidize the ore, and to reduce it progressively in the several stages to substantially metallic iron.

A portion of the reducing gases leaving the series of reduction zones is passed into the intermediate treating zone and burned with oxygen which is injected therein. Off-gas from the said intermediate treating zone can be contacted with the ore entering the staged preheat zones, or directly injected into staged preheat zones. The remaining portion of reducing gas from the staged reducing zones can be directly countercurrently passed through the series of preheat zones to fluidize and progressively heat the ore to reduction temperatures while simultaneously cooling the gases. In the alternative, all or a portion of the reducing gas directly fed to the staged preheat zones can be regenerated by removal of oxidized components and then reheated and recycled to the staged reduction zones. Where all of the reducing gas is regenerated, rather than being fed to the preheat zones, then the off-gas from the intermediate treating zone is fed directly into the staged preheat zones.

The present invention offers many advantages over processes employing only a single preheat stage. Thus, in the present invention, far greater thermal efficiency is provided by utilization of a series of preheat zones, the problems of ore decrepitation are greatly reduced or eliminated, and the recycle gas can be reduced to as low a temperature as desired, this eliminating the problems associated with handling hot gases, supra.

The low gas outlet temperature in the preheaters provides the advantages of avoiding thermal shock of the ore at high temperatures. Thus, the ore first contacts low temperature gases at, e.g., 200–900° F. and is then stepwise heated up to reducing temperatures. Such gradual, step-wise, ore heating greatly reduces or eliminates the acute problem of ore decrepitation and improves the reducibility of many types of ores. More important, by using a sufficient number of preheating stages to raise the ore temperature to essentially that of the upper reducing zone, oxygen addition can be reduced or eliminated since little or none is needed for heat generation. The decreased use of added oxygen, in turn, preserves the reducing power of the recycle gas. This, of course, reduces the purge rate required, and the net effect is a great saving in the total amount of gas required to carry out the reduction process.

The process of this invention takes advantage of the sensible heat of the recycle gas. Thus, prior to quenching the gas for regeneration, most of its sensible heat can be transferred to the incoming iron ore feed. This also eliminates the various mechanical problems associated with high temperature gas recycle. Any plural number of stages of preheating zones may be used advantageously, and the specific number of stages required will depend on a number of factors, e.g., susceptibility of the ore to decrepitation, the desired recycle gas temperature, and the respective feed rates and temperatures of the ore and reducing gases. Thus, when it is desired that the recycle gas be reduced to very low temperatures, i.e., about 200° F. or lower, it may be necessary to use a large number of preheating stages whereas if recycle gas in the temperature range of 600–900° F. is desired, a lesser number of stages will be required. Generally, however, for conventional fluid iron ore reduction operating conditions, from 2 to 7 stages will be preferred. More stages may, of course, be used; however, the benefits gained will be only marginal. Similarly, when an ore particularly susceptible to decrepitation is used, it will be necessary to employ more stages than would otherwise be required to accomplish the preheating in a sufficiently gradual manner.

The temperature gradient between the several stages of preheating zones can be of any magnitude so long as such temperature change between adjacent stages is not itself so great as to cause thermal shock. Similarly, the nominal residence time in each zone may be adjusted for both the ore and the gases by selection of appropriate bed volumes and flow rates. It is desirable for maximum thermal efficiency, however, that the residence time be at least sufficient to allow the outgoing gas and ore from each stage to approach approximate temperature equilibrium, i.e., attain temperatures within about 10–50° F., preferably within 20° F., of each other. Such approach to equilibrium can generally be attained at superficial gas velocities of about 1 to 5 ft./sec. and bed depths greater than about 0.5 feet with nominal residence times of about 10 to 60 minutes for the ore and about 0.1 to 10 seconds for the gases. More specifically, under the conventionally preferred iron ore reduction conditions, ore residence times of about 10 to 30 minutes and gas residence times of about 1 to 3 seconds in each stage of the preheating zones will prove adequate to achieve approximate temperature equilibrium.

While discrete stages of preheating zones have been described herein for illustrative purposes, it will be apparent that baffles or other means may be used to provide a staging effect to achieve a maximum temperature for the preheated ore while simultaneously obtaining a minimum temperature for the exiting recycle gas. The invention is not intended to be limited to any particular equipment or apparatus. Any apparatus will, of course, be operable so long as it results in a countercurrent staging effect in contacting the exiting reducing gas with the incoming ore.

When discrete stages of fluidized beds are used, it will generally be impractical to provide large numbers of stages due to the added expense and impractical reactor heights involved. Thus, it is economically preferable to use only 2 to 3 of such discrete stages. On the other hand, when baffles or other staging devices are employed, it is practical to use as many stages as are required to attain the desired degree of thermal efficiency and to overcome the problem of thermal shock. Thus, by using baffles, 2 to 5, or even more, effective stages may be achieved within a single fluidized preheating zone.

A treating zone, which may utilize a part, preferably a minor part, of the reducing gas from the reducing zones, is employed between the preheating zones and the reducing zones. Such treating zone may be used to further heat the ore to very high temperatures under a reducing atmosphere to achieve partial reduction in the treating zone itself and a faster reaction rate when the ores descend into the reducing zones. Also the treating zone can comprise an oxidizing atmosphere to burn and remove impurities such as sulfur-bearing components. Such treating zone may be heated by combustion of added fuel and oxygen (or an oxygen-bearing gas). The combustion gases from the treating zone can be used to dry incoming iron ore feed, as described hereinafter, thus taking advantage of the source of sensible heat to avoid waste and simultaneously eliminating the operating problems associated with the handling of high temperature combustion gases. On the other hand, the combustion products can be directly injected into the staged preheat zones, especially as where all of the remaining reducing gas from the staged reducing zones is regenerated, reheated and recycled to the staged reduction zones.

Preferably, a small quantity of oxygen-bearing gas, e.g., air, can be added to the preheat zones or the treating zone, or both. The oxygen-bearing gas is added to the preheat zones to reduce the required number of stages necessary to heat the incoming ore to reduction temperatures. Thus, under certain conditions the theoretical number of stages of preheating zones required to heat the ore to reduction zone temperatures may be so large as to be impractical. Such difficulty can be overcome by adding very small quantities of oxygen, e.g., 0.2 to 2 mole percent, to the gases in the preheating zones. It is important that such oxygen be injected in a zone wherein the major portion of the ore is magnetite, i.e., $Fe_3O_4$, or ferric oxide, i.e., $Fe_2O_3$, or both. Thus, if the oxygen is added at a point below the preheat zones where ferrous oxide (FeO) is present, such oxide might be oxidized back to $Fe_2O_3$ or $Fe_3O_4$, and the efficiency of the process will be correspondingly lowered.

If desired, a hydrocarbon fuel may be added to burn with the oxygen or to form additional reducing gas to replace that lost in combustion. Any fuel, of course, may be used; however, a gaseous fuel such as methane or natural gas is preferred. Any quantity of such fuel may be added up to the stoichiometric amount required to react with the added oxygen.

A feature of the invention resides in the unique result obtained by introducing air as the oxygen-bearing gas. Since hydrogen is increased in the preheat zones at the expense of carbon monoxide due to the water gas shift reaction: $CO+H_2O \rightarrow CO_2+H_2$, it is difficult to add enough sensible heat to the reducing gas to provide for the endothermic reduction reaction. This difficulty is overcome when air is added, since the nitrogen in the mixture acts as a heat carrier to increase the sensible heat. Thus, the preferred source for reducing gas is from a catalytic steam reformer where natural gas and steam react according to the reaction: $CH_4+H_2O \rightarrow 3H_2+CO$. However, if the gas heating furnace is hot enough to give products with sufficient sensible heat to maintain reduction temperatures in the reactor, then any methane present is subject to cracking which deposits carbon in the furnace. The introduction of air according to the process of this invention eventually results in an equilibrium concentration of 10 to 50 percent nitrogen in the recycle gas which greatly increases the heat capacity of the recycle stream. To avoid adversely affecting the kinetics of reduction due to nitrogen dilution of the reducing gas, the total reactor pressure may be increased safely such that the reducing components of the gas have the same partial pressure as would exist without the nitrogen addition. With the increased heat content due to the added nitrogen, the high reactor bed temperatures required for rapid reduction and high degree of metallization are feasible.

Another advantage obtained by employing a plurality of low temperature staged preheat zones and passing the ore countercurrently to the gases, is that the temperature of the gases is brought as low as desired for recycle while simultaneously the ore is progressively heated to temperatures approaching that of the reduction zones. Preferably, the ore is heated to the desired temperature of reduction, i.e., to a temperature ranging from about 1000° F. to 1800° F., and the gas is cooled to a temperature ranging from about 200° F. to 900° F., more preferably from about 600° F. to 900° F. It is particularly desirable that the reducing gas be allowed to approach equilibrium with the ore in the 600–900° F. temperature range since this range has been found to be the most favorable to the water gas shift reaction. Thus, temperatures within this range favor the shift towards hydrogen and result in a reduction of carbon monoxide in the recycle gas. Such water gas shift reaction is catalyzed and made feasible by the presence of the iron ore feed. With a relatively low carbon monoxide concentration in the recycle gas and low gas temperatures, there is considerably less danger of the occurrence of catastrophic carburization in the reactor or recycle process equipment. Thus, the use of the staged preheating zones of this invention not only results in a reduced concentration of the undesirable carbon monoxide, but also reduces its temperature to such low levels as to render it essentially harmless from the standpoint of the reversion and catastrophic carburization reactions. Also, the overall process equilibrium concentration of carbon monoxide is greatly lessened which makes feasible high pressure reactor operations, e.g., up to about 150 p.s.i.g., and higher. Such high pressure operations are particularly advantageous from the standpoint of reaction kinetics and reduced equipment size. With high carbon monoxide concentrations, operation at such high pressures may not be practical, if indeed possible, due to the carbon deposition resulting from carbon monoxide reversion.

Indicative of the effectiveness of this technique is the fact that in a typical operation employing a reducing gas made by the partial oxidation of methane, the reactor gas reaches equilibrium at a 6:1 hydrogen to carbon dioxide ratio when the top preheating zone is operated at a temperature of 770° F. On the other hand, when such zone is operated at higher temperatures, for example, 1300° F., the equilibrium hydrogen to carbon dioxide ratio is only 2:1.

For a better understanding of the invention, reference is made to the drawing which shows the combination of staged preheat zones, staged reducing zones and a treating zone located between the preheat and reducing zones, as well as a scheme for ore drying, screening and crushing.

Referring to the figure, a particulate oxidic iron ore, e.g., a wet iron ore, is introduced at inlet 23 to a mixing and drying vessel 24. The wet iron ore can consist entirely of ore as minded, or it can include ore which has been washed to induce the gangue content. Further, it can include ore fines which were previously entrained in reducing gases in a reduction process and were scrubbed from such gases and mixed with the incoming feed ore. The drying vessel 24 may comprise, e.g., a kiln, an agitated mixing vessel, or a fluidized bed. Hot recycle iron ore is also fed to the mixing vessel via line 25 at a temperature of, e.g., 500 to 600° F. Such ore provides the necessary heat to vaporize moisture in the wet ore feed and provides a lubricating effect to improve the flow characteristics of the overall mixture. The partially dry mixture of ore is then passed through line 26 to a set of screens 27 by means of which the ore particles are classified. Wet ore feed alone, of course, cannot be screened since it fouls the screen, and only by partially drying the ore, as by mixing with the hot recycle ore, can screening readily be achieved. Oversize particles, i.e., those greater than about 4 mesh, pass by means 28 to a crushing and grinding facility 29. Particles of acceptably small size pass from the screen through line 30 and are recombined with the crushed particles in line 31. The combined particles are then transported in disperse phase to cyclone 34 by means of a hot gas stream from the ore treating zone 45 entering through line 33. The hot gas stream serves to complete the drying of the ore and to impart the necessary sensible heat to the ore particles to provide heat to the fresh, wet, incoming ore in mixing vessel 24. The hot ore particles leave the cyclone 34 through line 25 and the exhaust gases leave through line 35.

Dry ore is directed to storage vessels or lock hoppers or other feeding means 37 by means of line 36. The ore is then fed as required through line 38 to a first preheating zone 39 maintained at low temperatures of, e.g., 200 to 900° F. by means of recycle reducing gas. The ore than passes into a second preheating zone 40, wherein its temperature is further increased, and finally exits through line 41 at a temperature of, e.g., 1000 to 1200° F.

A fluidizing air stream entering through line 42 picks up the ore from preheater 40 and transports it in disperse phase through transfer line 44 into an intermediate treating zone 45. Fuel may be injected as, for example, through line 43 to provide further burning and heating in the transfer line. By adjusting the fuel-to-air ratio, the atmosphere in the transfer line and treating zone can be made oxidizing or reducing as desired. The ore may be heated to high temperatures, e.g., 1100–1800° F., in this example 1500° F., with a reducing atmosphere in the treating zone, in order to improve the kinetics of the reduction process in the succeeding reducing zone operations. Alternately, treating zone 45 may be operated as an oxidizing zone by control of the gaseous atmosphere. Such oxidizing zone is useful to remove combustible impurities, for example sulfur, from the ore. Simultaneously, difficulty reducible magnetites can be preoxidized to the more readily reducible hematites.

The hot treated ore leaves treating zone 45 and passes through a series of reduction zones 46 where it is progressively reduced to a metallic iron product, exiting through line 48. Various internal cyclones 47 are provided as required in various preheating, treating, and reducing zones for purposes of removing fines from the various gas streams. The reducing gas is prepared by mixing a hydrocarbon fuel 49, generally natural gas or methane, with steam 50 in a catalytic reforming furnace 51. The reformer product then passes via line 52 through heat exchangers 53 where it is cooled by countercurrent heat exchange with regenerated recycle reducing gas. The cooled reformer gases exit through line 54 to a scrubbing and compression facility 55 where carbon dioxide and water are removed. The purified stream is mixed with regenerated recycle gas and passes back through line 56 to exchanger 53 to be reheated to high temperatures. The gas then passes via line 57 through a preheat furnace 58 to supply the additional heat required to bring the gases up to reduction temperatures. The heated reducing gas is then injected at about 1400 to 1650° F. into the bottom reducing zone via line 59. The gas passes up through the various reducing zones 46, fluidizing the iron ore and progressively reducing it to metallic iron.

A portion, generally a major portion, of reducing gas then exits from the top reducing zone via line 60 by which it is transported to the ore preheaters. On the other hand, if desired, all or a portion of the gas can be fed into the scrubbing and compression facility 55, regenerated, reheated in furnace 58, and recycled to the reduction zones 46. In either event, a minor portion of the reducing gas passes from the top reducing zone into treating zone 45 to fluidize the iron ore therein. The spent gases from the treating zone pass by means of line 33 back to the wet ore drying and crushing facility, previously described. If desired, the combustion gas can be injected into the preheater 40.

The reducing gases leaving the top ore preheater 39 pass by means of line 61 into a waste heat boiler 62 where sensible heat is recovered and the gas is reduced to a sufficiently low temperature for convenient handling, e.g., about 200° F. The gas then passes via line 63 to the scrubbing, regeneration, and compression facility 55, part of the gas being purged at outlet 64 and the remainder being recombined with fresh reformer gas to be recycled through line 56 back to the reducing zones. As will be apparent, it is generally desirable to maximize the fraction of reducing gas going to the preheaters via line 60 since this gas is conserved by ultimate recycling. Similarly, the ore-drying gas stream 33 is generally minimized. Of course, the amount of gas required to dry the ore will depend on many factors including, inter alia, the gas temperature, the moisture in the ore, and the type and nature of the ore; however, the fraction of reducing gas going from the reducing zones 46 to the treating zone 45 and then to the ore drying facilities will generally be within the range of about 5 percent to 25 percent of the total reducing gas. Also, of course, when sufficient gas is removed through the ore drying system, it is unnecessary to purge any recycle gas via outlet 64.

It is apparent that many modifications may be made to the particular examples described above without departing from the spirit and scope of this invention. Accordingly, it is not intended that the scope be limited by the above examples but only by the attached claims.

Having described the invention, what is claimed is:

1. A process for the production of metallic iron from oxidic iron ores comprising:

passing particulate iron ore feed through a plurality of staged fluidized preheating zones to heat the ore to a temperature of at least about 1000° F., passing the preheated ore to an intermediate fluidized treating zone, and then heating said ore to a temperature ranging from about 1100° F. to 1800° F.

progressively reducing the ore in a series of staged reducing zones to yield substantially metallic iron while simultaneously passing reducing gases through said reducing zones countercurrent to the flow of the iron ore, fluidizing the ore in said zones and partially oxidizing the reducing gases while simultaneously progressively lowering the level of oxidation of the iron ore, passing a portion of said partially oxidized reducing gases from the reducing zones through said intermediate fluidized treating zone, injecting oxygen-bearing gas into said treating zone to at least partially combust the gases therein to increase the temperature in said treating zone, passing the gaseous products of said partial combustion into contact with the partially dry iron ore feed to at least partially dry and heat same, regenerating another portion of said partially oxidized reducing gases withdrawn from the said reducing zones by removal of oxidized components, and recycling the regenerated reducing gas to the reduction zones.

2. The process of claim 1 wherein hydrocarbon fuel is added to said treating zone.

3. The process of claim 1 wherein the oxygen-bearing gas is air.

4. The process of claim 1 wherein sufficient oxygen is added to said treating zone to yield gaseous products which are oxidizing with respect to magnetite.

5. The process of claim 1 wherein the contacting and heating of the iron ore feed with the combustion gases from said treating zone is carried out in a disperse phase solids-gas system.

6. The process of claim 5 wherein at least a part of said heated iron ore feed is mixed with wet iron ore to partially dry and improve the flow characteristics of said wet iron ore.

7. The process of claim 1 wherein the ore in the staged fluidized preheating zones is maintained at from about 600 to about 900° F. in the final zone of the preheat series.

8. A process for the production of metallic iron from oxidic iron ores comprising:

passing particulate iron ore feed through a plurality of staged fluidized preheating zones to heat the ore to a temperature of at least about 1000° F., heating said ore to a temperature ranging from about 1100° F. to 1800° F. in an intermediate fluidized treating zone, and then progressively reducing the ore in a series of staged reducing zones to yield substantially metallic iron, passing reducing gases through said reducing zones countercurrent to the flow of the iron ore, fluidizing said zones and partially oxidizing the reducing gases while simultaneously progressively lowering the level of oxidation of the iron ore, passing a major portion of said partially oxidized reducing gases from the reducing zones through said preheat zones to fluidize and progressively preheat the said iron ore feed therein, passing a minor portion of said partially oxidized reducing gases from the reducing zones through said treating zone, injecting oxygen-bearing gas into said treating zone to at least partially combust the gases therein to increase the temperature in said treating zone, passing the gaseous products of said partial combustion to contact and heat and at least partially dry said iron ore feed prior to the introduction of said feed into said staged preheating zones.

9. The process of claim 8 wherein hydrocarbon fuel is added to said treating zone.

10. The process of claim 8 wherein the oxygen-bearing gas is air.

11. The process of claim 8 wherein sufficient oxygen is added to said treating zone to yield gaseous products which are oxidizing with respect to magnetite.

12. The process of claim 8 wherein the contacting and heating of the iron ore feed with the combustion gases from said treating zone is carried out in a disperse phase solids-gas system.

13. The process of claim 12 wherein at least a part of said heated iron ore feed is mixed with wet iron ore to partially dry and improve the flow characteristics of said wet iron ore.

14. In a process for the production of metallic iron from oxidic iron ores, the combination comprising:

(a) contacting particulate iron ore feed in a series of preheat stages formed by countercurrent contact of the ore with hot ascending gases to fluidize the ore, progressively preheat the ore to a temperature of at least about 1000° F. while simultaneously cooling the gas to a temperature within the range of from about 200 to about 900° F., (b) transferring the preheated ore to a series of intermediate treating stages, contacting the ore with hot gases, fluidizing the ore and elevating its temperature within a range of from about 1100° F. to about 1800° F., (c) transferring the ore to a series of reduction stages and progressively reducing the ore by countercurrent contact with hot gases to fluidize the ore and progressively lower the level of oxidation of the iron ore while simultaneously partially oxidizing the gases, (d) passing a major portion of the said partially oxidized reducing gases from the said reducing stages (c) to the preheat stages (a), (e) passing a minor portion of the gas from the said series of reducing stages (c) to the intermediate fluidized treating stages (b) while injecting oxygen-bearing gas into the said treating stages (b) to at least partially combust the gases therein to increase the temperature, and thence, (f) passing partially oxidized gases from the said intermediate fluidized treating stages (b) to contact and heat the iron ore fed to the preheat stages (a).

15. The process of claim 14 wherein the ascending fluidizing gas in preheat stages (a) is cooled to a temperature within the range of from about 600 to about 900° F.

16. The process of claim 14 wherein the preheated ore from preheat stages (a) is withdrawn, contacted with an air stream and transported in disperse phase to the intermediate fluidized treating stages (b).

17. The process of claim 16 wherein the series of intermediate fluidized stages (b) is located above the said series of preheat stages (a), and the ore is gas lifted from (a) to (b).

18. The process of claim 16 wherein fuel is injected into the fluidized air stream and the resultant mixture burned to preheat the ore.

19. The process of claim 18 wherein the ore is heated to temperatures ranging from about 1100 to about 1800° F. in a reducing atmosphere.

20. The process of claim 18 wherein the ore is heated to temperatures ranging from about 1100 to about 1800° F. in an oxidizing atmosphere.

References Cited

UNITED STATES PATENTS

| | | | |
|---|---|---|---|
| 2,990,269 | 6/1961 | Hyde | 75—26 |
| 3,118,757 | 1/1964 | Peras | 75—26 |
| 3,126,276 | 3/1964 | Marshall | 75—26 |
| 3,135,598 | 6/1964 | Mizushima | 75—26 |
| 3,246,978 | 4/1966 | Porter | 75—26 |

WINSTON A. DOUGLAS, Primary Examiner

P. D. ROSENBERG, Assistant Examiner

U.S. Cl. X.R.

75—34